US006468614B1

(12) United States Patent
LeVine et al.

(10) Patent No.: US 6,468,614 B1
(45) Date of Patent: Oct. 22, 2002

(54) APPARATUS FOR DISPLAYING PAPER, FABRIC, PHOTOGRAPHS OR THE LIKE

(76) Inventors: Anna L. LeVine, 259 W. Fourth St., Apt. 15, New York, NY (US) 10014; Kermit S. Westergaard, 220 Grand St., 3rd Floor, Brooklyn, NY (US) 11211

(*) Notice: Subject to any disclaimer, the term of this patent is extended or adjusted under 35 U.S.C. 154(b) by 0 days.

(21) Appl. No.: 09/528,205

(22) Filed: Mar. 17, 2000

(51) Int. Cl.[7] .................................... B32B 15/00

(52) U.S. Cl. .................... 428/40.1; 40/449; 40/600; 40/661.01; 248/467; 248/683; 248/684; 428/40.9; 428/41.7; 428/41.8; 428/42.1; 428/42.2; 428/42.3; 428/43; 428/900

(58) Field of Search ...................... 428/40.1, 40.9, 428/41.7, 41.8, 42.1, 42.2, 42.3, 43, 900; 40/661.01, 449, 600; 248/683, 684, 467

(56) References Cited

U.S. PATENT DOCUMENTS

| | | | | |
|---|---|---|---|---|
| 4,254,569 A | | 3/1981 | Janik | 40/606 |
| 4,525,115 A | | 6/1985 | Garner, Sr. | 40/158 A |
| 4,584,223 A | | 4/1986 | Krapf | 428/58 |
| 4,785,562 A | | 11/1988 | Good | 40/159.1 |
| 4,837,953 A | | 6/1989 | Tannenbaum | 40/124 |
| 5,295,342 A | | 3/1994 | Roche et al. | 52/764 |
| 5,303,489 A | | 4/1994 | Blegen | 40/152 |
| 5,309,659 A | | 5/1994 | Eastman | 40/600 |
| D349,733 S | | 8/1994 | Svee | 40/124.1 |
| 5,342,665 A | | 8/1994 | Krawitz | 40/40.1 |
| 5,384,999 A | * | 1/1995 | Roche | 52/764 |
| 5,641,116 A | | 6/1997 | Martin | 229/92.8 |
| 5,666,712 A | | 9/1997 | Cvetkov | 29/458 |
| 5,709,409 A | | 1/1998 | Engel | 281/29 |
| 5,755,338 A | | 5/1998 | vom Braucke et al. | 211/13.1 |
| 5,832,831 A | * | 11/1998 | Boyle | 101/375 |
| 5,842,721 A | | 12/1998 | Kawabe | 281/45 |
| 5,868,498 A | | 2/1999 | Martin | 383/11 |
| 5,947,437 A | | 9/1999 | Tate et al. | 248/467 |
| 5,987,825 A | | 11/1999 | Rosen | 52/36.1 |

FOREIGN PATENT DOCUMENTS

| | | | |
|---|---|---|---|
| JP | 7013492 | * | 1/1995 |

* cited by examiner

*Primary Examiner*—Nasser Ahmad
(74) *Attorney, Agent, or Firm*—John P. White; Cooper & Dunham LLP

(57) ABSTRACT

An apparatus for displaying paper, fabric, photographs or the like, comprises a long, narrow strip of thin ferromagnetic spring steel, and a number of small tacks embedded with rare earth magnets or other magnets. A tape-like dispenser stores unused tacks and a portion of the strip that has yet to be used. The strip of spring steel is covered on one face by a strong adhesive. The adhesive side, when the strip has not been used, is covered by a protective layer, such as wax paper. The spring steel is rolled up inside the dispenser. The strip may be divided at regular intervals by a cut through the protective paper and adhesive layer, the cut line scoring the spring steel.

8 Claims, 9 Drawing Sheets

APPARATUS FOR DISPLAYING PAPER, FABRIC, PHOTOGRAPHS OR THE LIKE

BACKGROUND OF THE INVENTION

The present invention relates to an apparatus for displaying paper, fabric, photographs or the like. In particular, the invention relates to a device that can be attached to a vertical surface such that the items displayed are disposed substantially in a vertical plane for viewing.

It is commonplace to attach paper, fabric, photographs or the like to a vertical surface using a conventional bulletin board with tacks. However, this conventional method results in the puncturing of the article. Furthermore, the aesthetic aspect of a bulletin board is not always desirable.

It is also commonplace to attach paper, fabric, photographs or the like to a vertical metal surface, such as on a refrigerator, by using a magnet. This method does not accommodate, however, situations in which a metal surface to which a magnet would adhere is not conveniently located near the desired hanging location. Additionally, it is not always aesthetically desirable to display articles on furniture with such a surface.

SUMMARY OF THE INVENTION

It is an objective of this invention to provide an apparatus for displaying paper, fabric, photographs or the like in which the items displayed are not punctured or damaged in any way.

Another objective of this invention is to provide an apparatus for displaying paper, fabric, photographs or the like which can be adapted to blend into any environment and/or to be virtually invisible.

Yet another objective of this invention is to provide an apparatus for displaying paper, fabric, photographs or the like which can be adapted to be aesthetically pleasing.

It is also an objective of this invention to provide an apparatus for displaying paper, fabric, photographs or the like which requires very little space.

A strip of ferromagnetic metal for use as a bulletin board for attaching an item along with a magnetic tack on a substantially vertical surface comprises a ferromagnetic layer, at least one adhesive layer attached to one side of the ferromagnetic layer, and a protective layer attached to an outermost one of the at least one adhesive layer, wherein the protective layer is removed before the strip is applied via the at least one adhesive layer to the substantially vertical surface, and the other side of the ferromagnetic layer is used for attaching the item using the magnetic tack. The ferromagnetic layer may comprise spring steel. The other side of the ferromagnetic layer may be preprinted with a predetermined design.

The strip may be divided at regular intervals by a cut through the protective paper and adhesive layer. The cut scores the ferromagnetic layer to form a division line, and the strip may be snapped by bending the strip back and forth at the division line.

An unused portion of the strip may be stored in a dispenser. The strip stored in the dispenser may be rolled up inside the dispenser. A selected portion of the strip stored in the dispenser would be dispensed while another portion of the strip remains contained in the dispenser. The dispensed portion of the strip may spring flat when dispensed. The dispenser may include a tack storage compartment.

An apparatus for displaying an item such as paper, fabric, photographs or the like comprises at least one magnetic tack, and at least one strip comprising ferromagnetic metal, wherein one face of each of the at least one strip is covered by an adhesive for applying the one face to a substantially vertical surface, and another face of each of the at least one strip provides a surface for attaching the item using the at least one magnetic tack. The at least one magnetic tack may comprise a rare earth magnet.

The adhesive on the one face of the at least one strip may be covered by a protective paper, and the protective paper would be removed before the at least one strip is applied to the substantially vertical surface.

Each of the at least one strip may be divided at intervals, which preferably are (but need not be) regular, by a plurality of score lines, and a selected length of a strip would be broken at a selected one of the plurality of score lines.

The apparatus may further comprise a dispenser, wherein unused portions of the at least one strip would be stored in the dispenser. A dispensed strip dispensed by the dispenser may be mounted, via the adhesive on the dispensed strip, onto a substantially vertical surface. The mounted strip would be used as a bulletin board surface to receive the at least one magnetic tack.

A selected portion of a strip which is dispensed by the dispenser may be broken at a selected one of the plurality of score lines, with an unused portion of the strip remaining contained inside the dispenser.

The at least one strip may be rolled up inside the dispenser. A length of a strip which is dispensed from the dispenser preferably springs flat after the length is dispensed.

Alternatively, the dispensed strip would be flattened when applied to the substantially vertical surface.

The dispenser may comprise an outer cylinder and an inner cylinder placed concentrically within the outer cylinder. The at least one strip would be wrapped around the inner cylinder in a first space which is between the outer cylinder and the inner cylinder. A second space which is surrounded by the inner cylinder would be a tack storage compartment.

The dispenser further may comprise a spring attached to an interior wall of the outer cylinder. The spring would maintain pressure on the at least one strip against an exterior wall of the inner cylinder to keep the at least one strip from unwinding in an interior of the outer cylinder.

The outer cylinder may include at least one window through which the at least one strip is dispensed.

The dispenser further may comprise a cylindrical lid which is threaded into a ledge on one end of the inner cylinder. The cylindrical lid would be turned in a first direction to turn the inner cylinder, and in a second direction opposite to the first direction to release the cylinder lid.

The strips mounted on the vertical surface function like a bulletin board, but require very little space and can be virtually invisible. Furthermore, the items displayed on the strips are held by magnetic force and are consequently not punctured or damaged in at way. Another advantage of the present invention is that the tack needs to be handled only to put up the displayed object; the object displayed can be pulled off without handling the tack which would remain up on the spring steel strip because of the magnetic force.

These and other objectives and advantages of the invention would be apparent from the specification as a whole.

BRIEF DESCRIPTION OF THE DRAWINGS

The above and numerous other objectives, features and advantages that may be achieved by the present invention would be more readily understood from the following detailed description by referring to the accompanying drawings wherein.

DETAILED DESCRIPTION OF THE INVENTION

To explain the invention, we describe some embodiments in connection with the figures and their supporting descriptions provided below. It should be understood, however, that the invention is not limited to the precise embodiments described below and that various changes and modifications thereof could be effected by one skilled in the art without departing from the spirit or scope of the invention.

An apparatus for displaying paper, fabric, photographs or the like, in a preferred embodiment of the present invention, would include at least one very thin ferromagnetic spring steel strip, at least one plastic tack embedded with rare earth magnet and a plastic dispenser for storing unused tacks and strips. The strip preferably has a thickness in a range of approximately 0.005 to 0.015 inches. The strip could be thinner or thicker, depending on the magnetic force of the magnets and weight of the object to be hung.

The word "strip" as used herein is meant to include any ribbon, band, sheet, circle or irregular piece of thin spring steel, which can be backed by adhesive, for the purpose of being adhered to a wall or other place as a display surface. While the preferred embodiment of this invention is a narrow ribbon of spring steel rolled into the dispenser described herein, the strip itself can in fact take any shape or size and can be rolled into the dispenser or packaged independently, loosely or otherwise. As one example, strips of the described spring steel can be attached to one another like sheets of paper in a pad, and removed one by one from the pad for use.

In the preferred embodiment, the dispenser is injection molded from plastic. The dispenser may comprise two concentric cylinders, an external one (larger) and an internal one (smaller). The inner cylinder is placed concentrically within the outer cylinder to create two significant spaces, one between the two cylinders for storing the spring steel strip which is wrapped around the inner cylinder and the other in the center of the inner cylinder for storing the unused tacks. A third component of this dispenser is a removable cap that screws into one side of the inner cylinder.

Figure 1C:
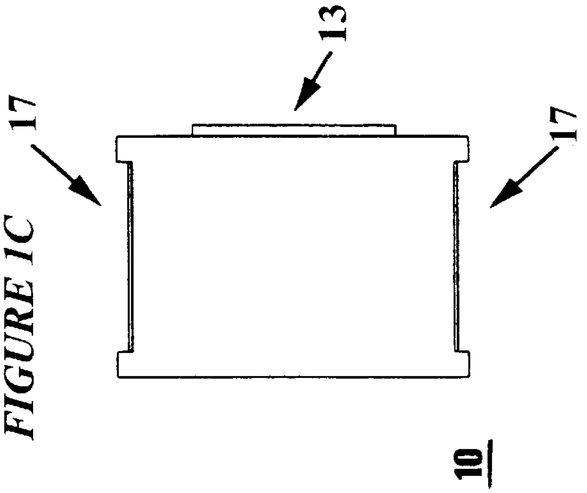
FIGS. 1A, 1B and 1C show front, top and side views, respectively, of an outer cylinder of a dispenser in accordance with one embodiment of the present invention.
Figure 1A:
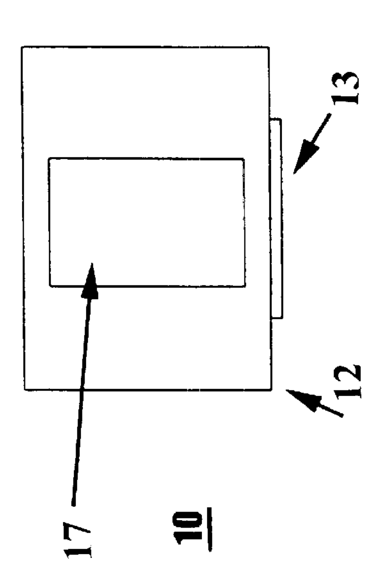
Figure 1B:
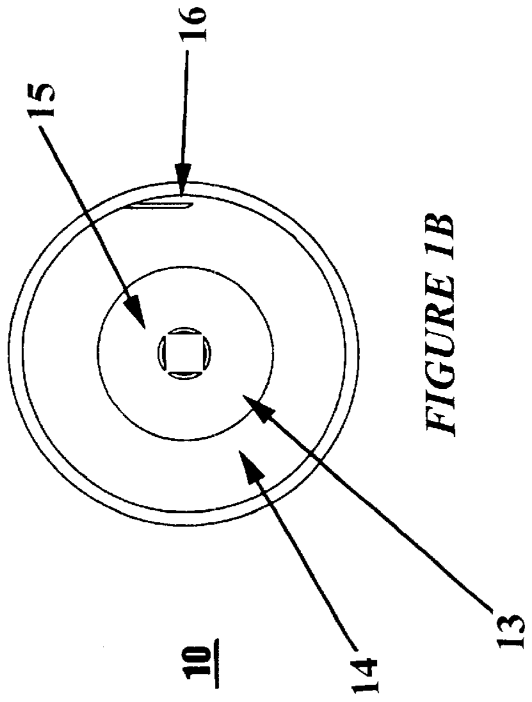

Referring to FIGS. 1A, 1B and 1C, an outer cylinder 10 of a dispenser 1, in accordance with a preferred embodiment of the present invention, comprises a hollow cylinder with an open top 11 and a closed bottom 12 having a circular foot 13 which is positioned a step lower than a main cylinder bottom 14. Additionally, the bottom 12 supports a male portion of a clip 15, which is centered in the foot 13. There is also a flexible protrusion 16 which is molded into the interior side of outer cylinder 10 and acts as a spring. The side of the outer cylinder 10 has two cut out openings 17 on respective opposite sides.

Figure 2C:
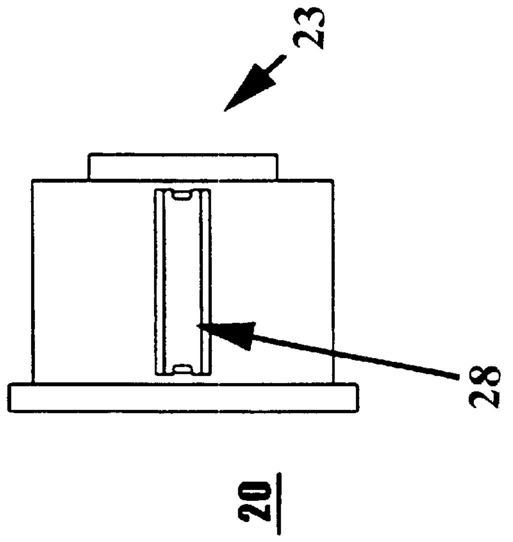
FIGS. 2A, 2B and 2C show front, top and side views, respectively, of an inner cylinder of a dispenser in accordance with one embodiment of the present invention.
Figure 2A:
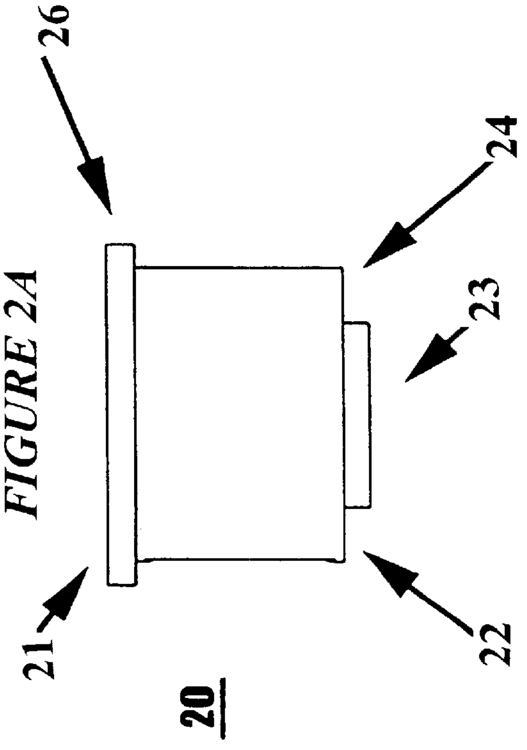
Figure 2B:
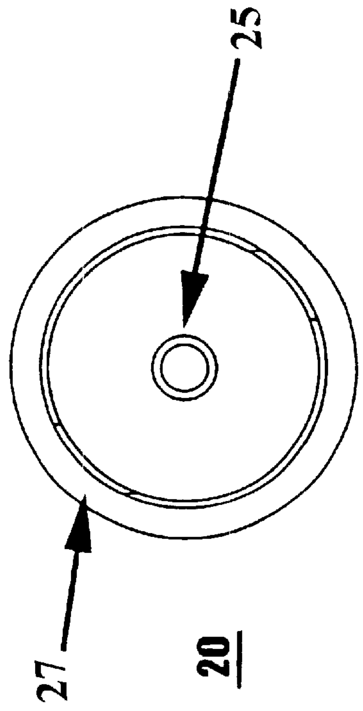

FIGS. 2A, 2B and 2C show an inner cylinder 20 of dispenser 1. Inner cylinder 20 comprises a hollow cylinder with an open top 21 and closed bottom 22 having a circular foot 23 which is positioned a step lower than the main cylinder bottom 24. Additionally, the bottom 22 has a portion 25, which acts as the female to clip 15 and is centered in the foot 23. Lip 26 at the top of inner cylinder 20 extends out from cylinder 20 and extends around the entire circumference of cylinder 20. A small ledge 27 is threaded to receive the top of the container. The side of inner cylinder 20 preferably has a cut out opening 28 which acts as a fixed point on inner cylinder 20 at which the spring steel can be attached. Alternatively, one of the many other means, such as a clip, known to a skilled artisan may be used to provide the fixed point.

Figure 3C:
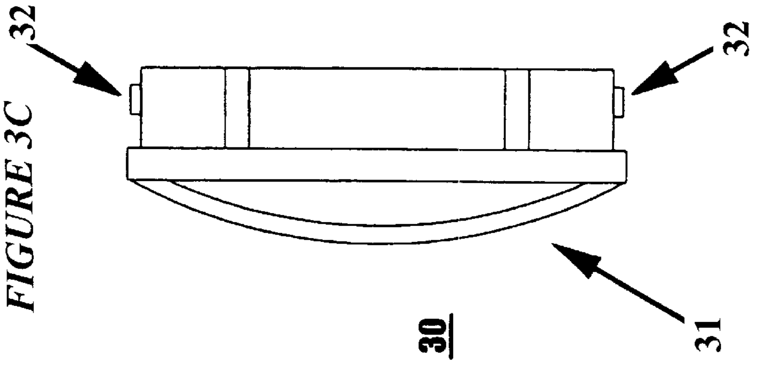
FIGS. 3A, 3B and 3C show front, top and side views, respectively, of a container lid of a dispenser in accordance with one embodiment of the present invention.
Figure 3A:
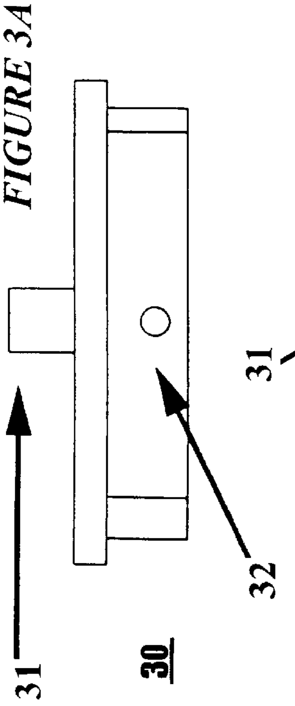
Figure 3B:
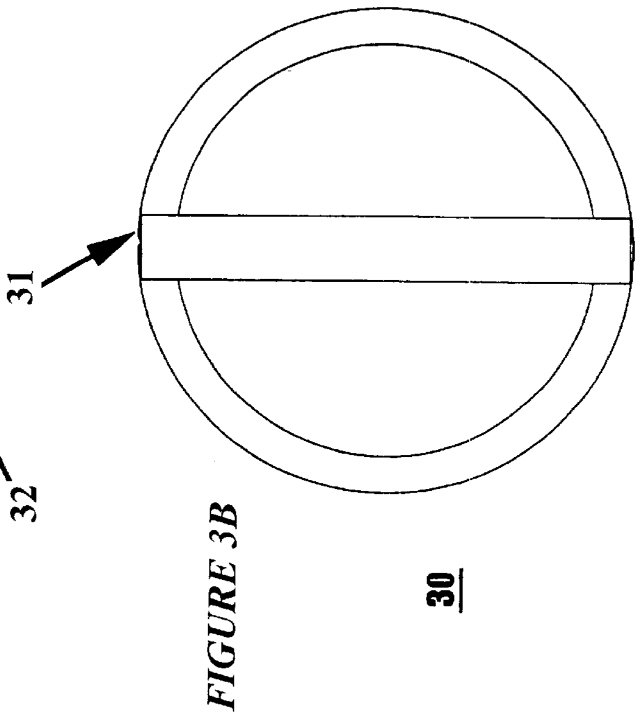

FIGS. 3A, 3B, and 3C show cylindrical lid 30 of dispenser 1. Cylindrical lid 30 comprises a handle 31 and two pins 32, which thread into ledge 27 in inner cylinder 20.

FIGS. 4A–4D show dispenser 1 with the combination of outer cylinder 10, inner cylinder 20 and cylindrical lid 30.

Figure 4A:
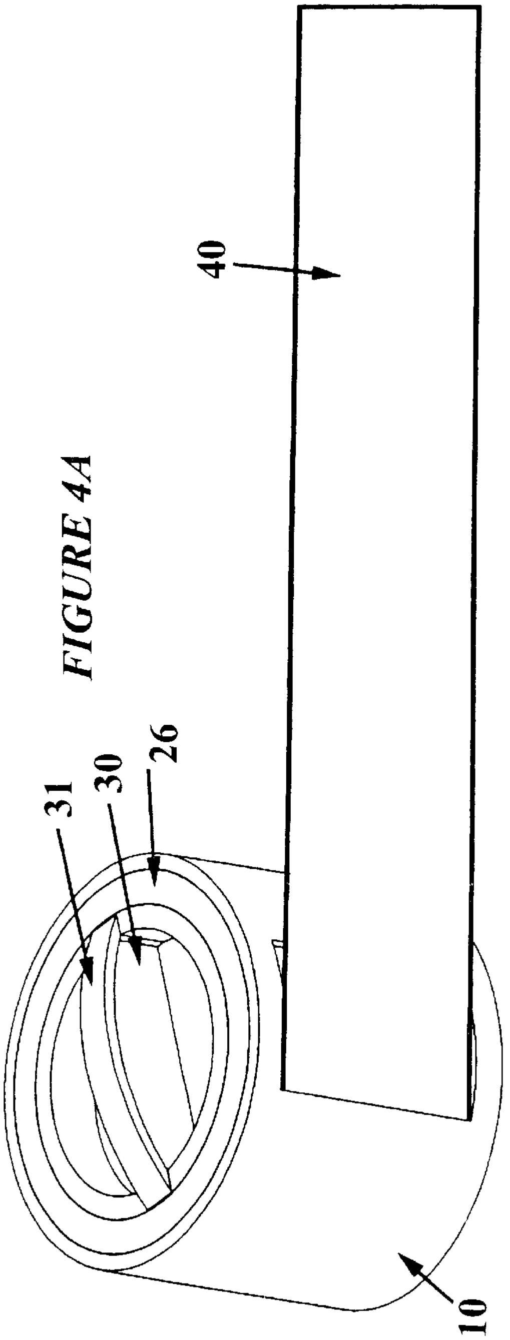
FIG. 4A shows a perspective view of a dispenser, with its lid in place and with a portion of a steel strip protruding therefrom, in accordance with one embodiment of the present invention.
Figure 4B:
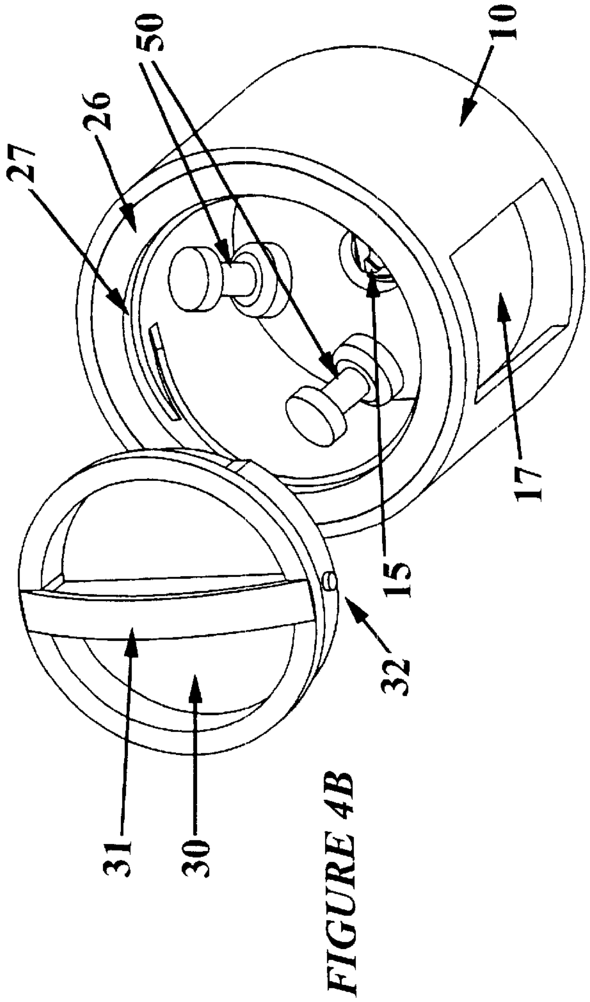
FIG. 4B shows a perspective view of the dispenser shown in FIG. 4A, with its cylindrical lid removed, with tacks contained therein.
Figure 4C:
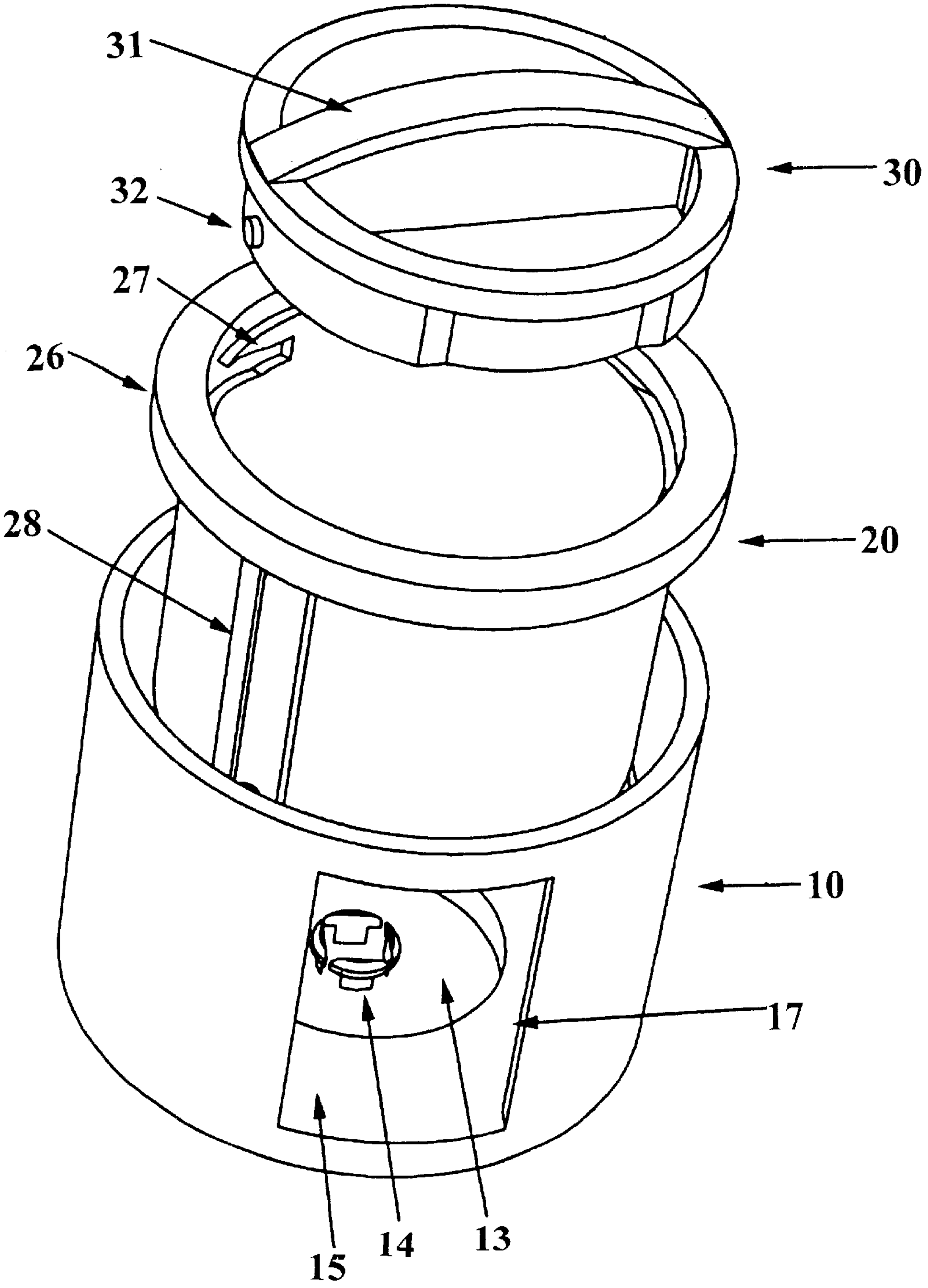
FIG. 4C shows an exploded perspective view of assembly of the dispenser shown in FIGS. 4A and 4B.
Figure 4D:
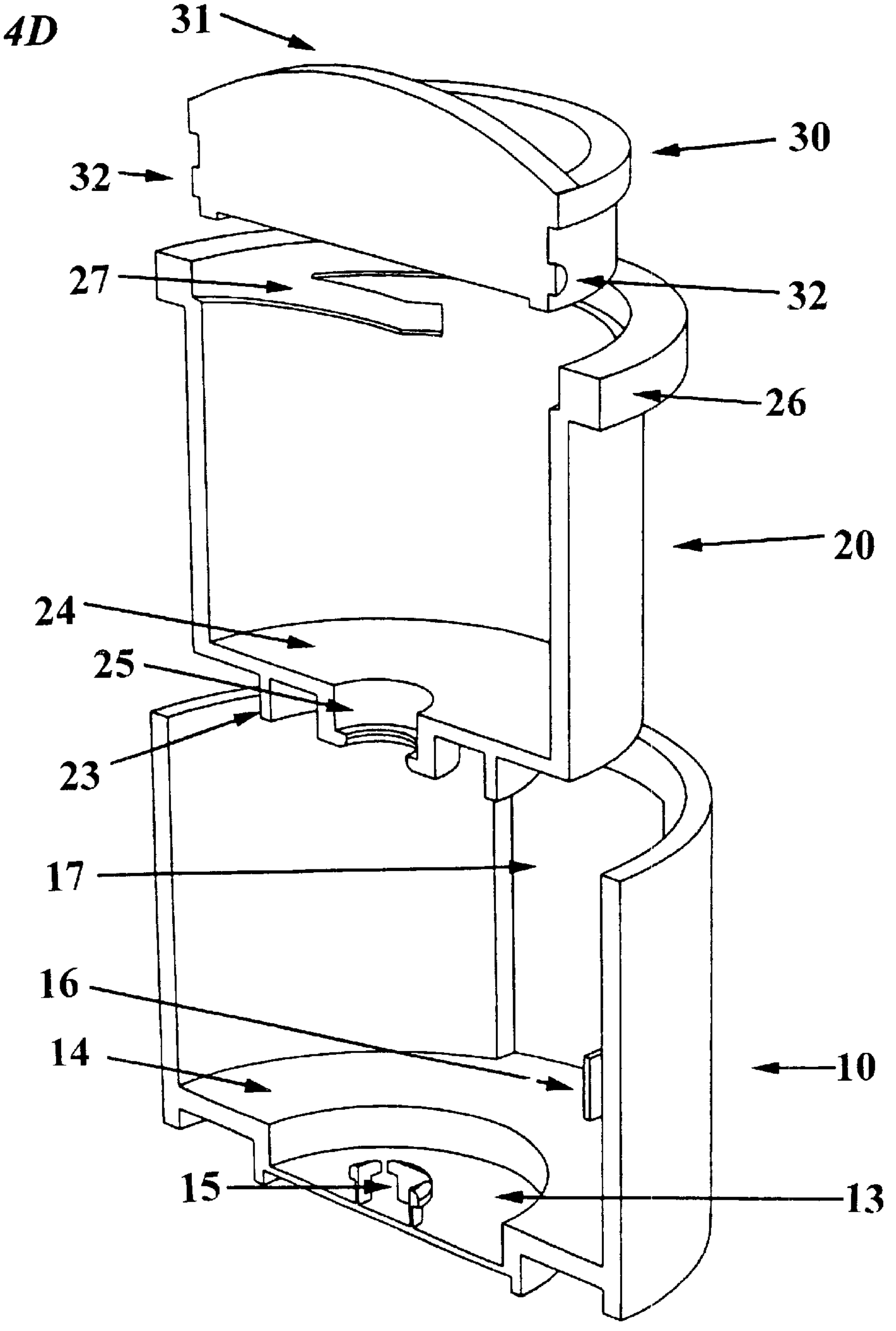
FIG. 4D shows an exploded perspective view of a section of the dispenser shown in FIGS. 4A, 4B and 4C.

Inner cylinder 20 snaps into outer cylinder 10 with clip 15 snapping into female portion 25 and foot 23 fitting into foot 13. As shown in FIG. 4B, lip 26 is flush with the top of the interior wall of outer cylinder 10. Inner cylinder 20 can rotate freely inside outer cylinder 10.

A strip 40 of spring steel is wrapped around the exterior of inner cylinder 20 with a first end of strip 40 fixed at opening 28. The protrusion 16 acts as a spring maintaining constant pressure to keep strip 40 from unwinding against the interior of outer cylinder 10. The dispenser may have any number of such springs in any number of materials to achieve this constant pressure on the spring steel against the interior of the outer cylinder.

Lid 30 of the container is turned past the maximum tightness of the threads in ledge 27 in order to turn the inner cylinder and the attached strip of spring steel. When a second end of the spring steel reaches one of the openings 17, it springs out enough for someone to take the end of the strip and pull it to the desired length. The strip can then be snapped at one of the regular intervals.

Lid 30 then may be turned in the same direction to pull the unused portion of the spring steel back into the container. If the lid is turned in the opposite direction, the pins 32 are released from the threads in the ledge 27, exposing the interior of the inner cylinder, an area which acts as storage place for the magnetic tacks, as shown in FIG. 4B. In order to restrain the movement of the interior container when the intent is to remove the lid, additional vertical ledges on the inside of the outer cylinder may be included to catch the end of the ferromagnetic spring steel and stop rotation only when turned in the lid-releasing direction.

Figure 5A:
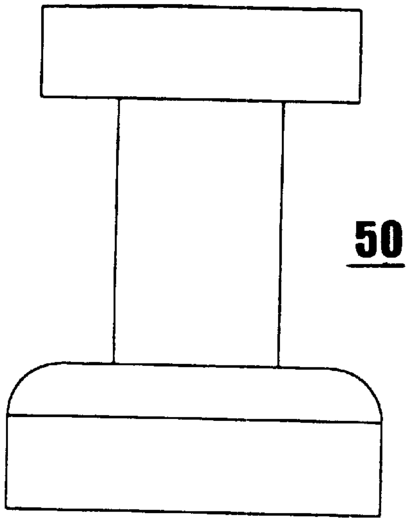
FIGS. 5A, 5B and 5C show front, bottom and perspective views, respectively, of a magnetic tack in accordance with one embodiment of the present invention.
Figure 5B:
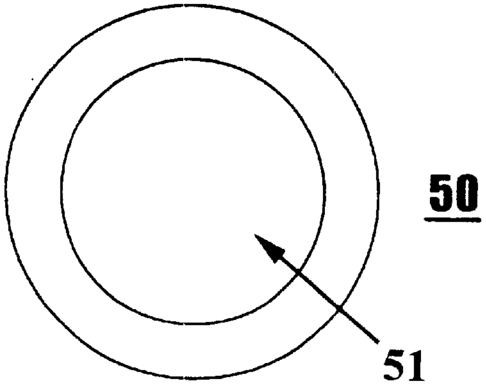
Figure 5C:
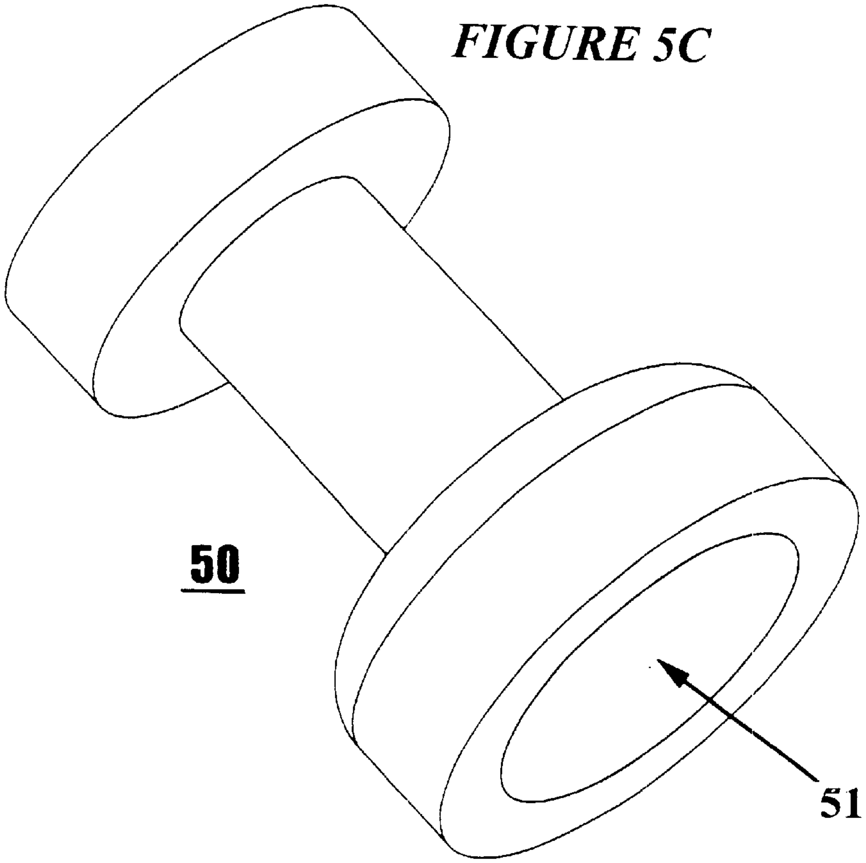

FIGS. 5A, 5B AND 5C show various views of a standard-sized magnetic tack 50 that may be used with a preferred embodiment of the present invention. Tack 50 is embedded with magnet 51. The tack is preferably spool-shaped and/or molded from plastic. The magnet is preferably a rare earth magnet. For example, the magnet may be a neodymium disc with a diameter of 0.25 and a thickness of 0.1 with a strength of approximately 30 (grade in MGO).

The preferred embodiment of this apparatus utilizes rare earth magnets embedded in standard-size tacks. Tacks of different shapes and sizes, embedded with magnets of various strengths, also may be used. The magnets may also be embedded in plastic or the like configured with a hook or clip on the other side, allowing items such as keys to be hung up on the metal strips. Alternatively, a magnet, without being embedded in plastic molding, may be used by itself as the tack. For example, in some circumstances, such as when the tack is used to hang a poster in a dormitory room, one might be more concerned with minimizing the visual impact of the magnet than with the ease of handling the magnet. Consequently, it might be desirable not to embed the magnet in any molding.

Figure 6:
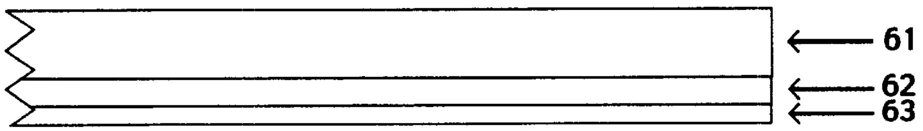
FIG. 6 shows a section view of a steel strip in accordance with one embodiment of the present invention.

FIG. 6 shows a section view of a strip of spring steel in accordance with a preferred embodiment of the present invention. The strip may have three layers, including spring steel 61, adhesive layer 62 and protective layer 63. The protective layer may be, for example, wax paper. Once removed from the container, the strips can be cut to any length by bending them quickly at scored intervals.

In the preferred embodiment of this apparatus, the strip comprises ferromagnetic spring steel which is approximately 1 inch wide and sufficiently thin to facilitate rolling. The strip preferably has a thickness in the range of approximately 0.005 to 0.015 inches. The strip could be thinner or thicker, depending on the magnetic force of the magnets and weight of the object to be hung. The strip may be packaged in a variety of lengths. The dimensions of the container should be consistent with the width and length of the strip, but the outer cylinder of a dispenser for use by consumers in a regular retail market preferably has a diameter of approximately 2 inches. When dispensed from the container, the strip may be applied to adhere to a surface such as a wall, furniture or ceiling, to turn that surface into a de facto bulletin board for use with rare earth magnet tacks.

The spring steel strip may be pre-painted in a variety of colors, in a metallic finish, or they can be painted or wallpapered over by the consumer to blend into any environment.

The spring steel strips can be smooth or textured or grooved or otherwise designed to mate with a tack that is also textured or is designed to engage with the strip (either the magnet itself or the mating surface of the plastic housing). The mating of the elements would increase the friction and result in greater holding power. This would prevent the magnet from sliding on the strip when heavier objects are being hung.

Figure 7:
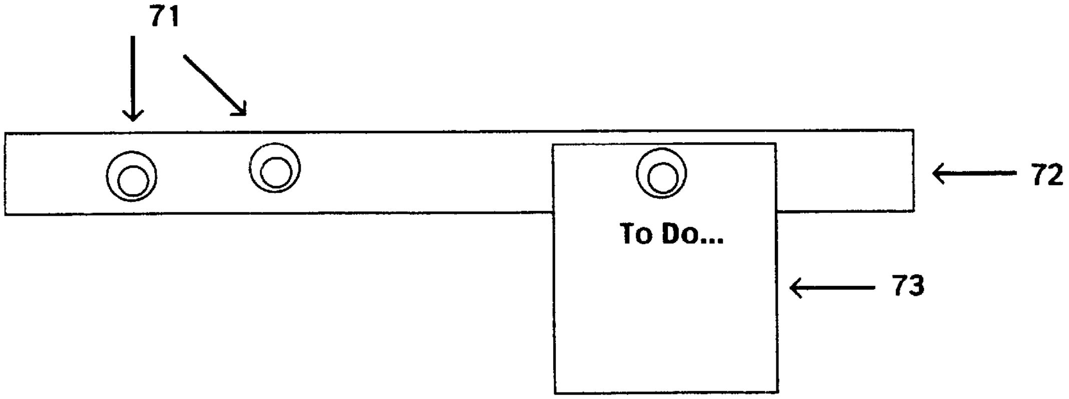
FIG. 7 shows a front view of an apparatus for displaying a sample piece of paper, in accordance with one embodiment of the present invention.

FIG. 7 shows an example of a use of the present invention in a preferred embodiment. A tack 71 is used to hold up paper 73 against strip 72.

Figure 8A:
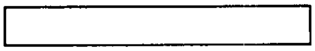
FIGS. 8A, 8B and 8C show respective exemplary formations of steel strips adhered to a vertical surface.
Figure 8B:
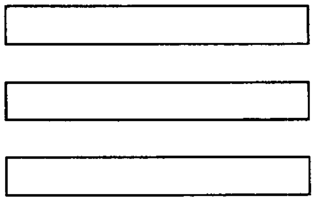
Figure 8C:
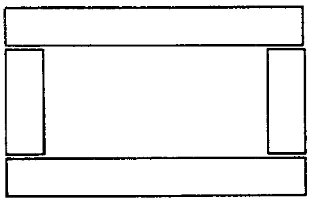

The above-described apparatus functions like a bulletin board. After pulling the ferromagnetic spring steel strip from the dispenser, the user snaps or cuts the strip to desired length, removes the wax paper to expose the adhesive and sticks the strip to, for example, a wall. The strips may be adhered to the wall or surface horizontally, vertically, or diagonally and in any configuration of multiple strips, such as a grid. Any number of strips of varying lengths can be used together in different formations, as shown for example in FIGS. 8A–8C, to suit the user's needs.

This bulletin board can be used to display paper, photographs, X-rays, blueprints, textiles and so forth, without puncturing the displayed items in any way. This apparatus can be used as such in the offices of doctors, architects, photographers, designers, magazines and any other office or darkroom, studio, construction site, film set, police station, locker room or showroom where multiple proofs, images, plans or papers must be viewed and rearranged without being punctured or altered in any way. It can also be used in students' dormitory rooms, children's bedrooms, classrooms or any environment in which use by different people requires that the walls remain intact and the turnover is as efficient as possible. In addition, this apparatus can be used to turn any space, no matter now narrow, oddly shaped or out of the way, into a viable display surface.

While the preferred embodiment of this apparatus uses narrow strips, the strips in fact may be produced in any width and scored or not scored to create perforated series of metal sheets, bands, etc. Likewise, the length of the strip depends only on its intended use. For example, very long strips can be rolled into one container for industrial use, whereas shorter amounts can be packaged for use by the average consumer. In each case, the dimensions of the container may be adjusted to the demands of the width and length of the strip/band/sheets of metal which it is designed to contain.

The metal strip and container can be packaged with or without the rare earth magnet tacks. Depending on use, the tacks can be sold separately. For example, a university dormitory might buy the metal strips in industrial lengths and apply them to all the bedroom walls before repainting them at the beginning of the semester. When the students move in, they may hang up tapestries and posters on the strips by using rare earth magnet tacks available at the university bookstore. At the end of the semester, the students may remove their tapestries and posters without harming the walls and move on, leaving the walls of the bedrooms intact and taking their own tacks with them.

Additional manifestations of the present invention beyond the preferred embodiments discussed above are described below, along with possible modifications to the above-described components of the apparatus.

The ferromagnetic spring steel strip, sheet, etc., may be designed for temporary and multiple use by backing the metal with several layers of paper coated with a weaker, removable adhesive. In this form, the strips can be used in a mutable and disposable way, for example in locations such as a film set or a party location, where different items such as directions, decorations etc. may be hung up briefly in one place and then moved to another. In order to move the strip from one location to another, the user must only pull off an outermost layer of paper to reveal fresh adhesive.

Figure 9:
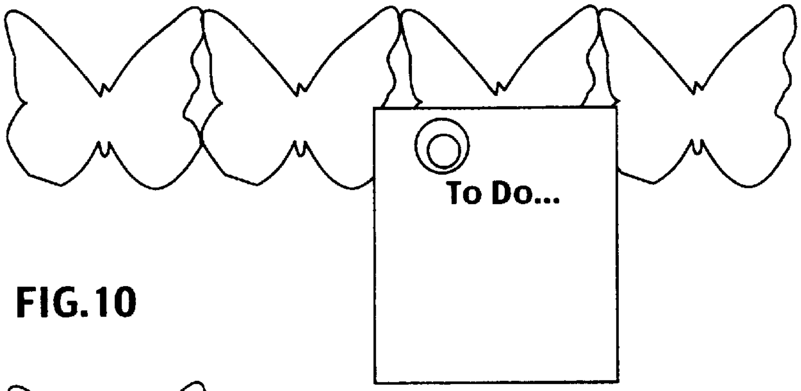
FIG. 9 shows an example of a steel strip printed with images and cut in an irregular shape, in accordance with one embodiment of the present invention.
Figure 10:
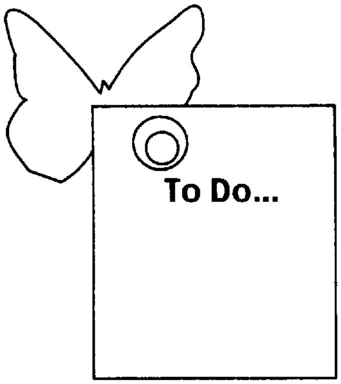
FIG. 10 shows use of a single section of the strip shown in FIG. 9.
Figure 11:
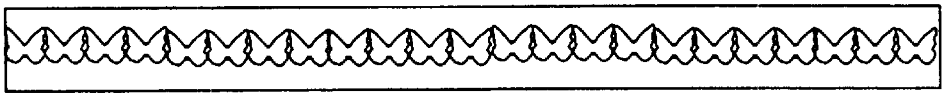
FIG. 11 shows an example of a steel strip printed with images, in accordance with another embodiment of the present invention.

As shown exemplarily in FIGS. 9–11, the ferromagnetic spring steel strip or sheet may be printed, etched, painted or die-cut with words, designs or illustrations, for the purposes of decoration, signage or utility (for example, as a measurement tool) with or without its function as a display surface.

Figure 12:
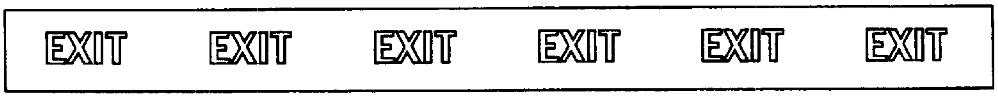
FIG. 12 shows an example of a steel strip either printed with text or with text cut out for use as a stencil, in accordance with yet another embodiment of the present invention.

For example, exit signage for doors in a new building could be easily created and installed using rolls of the perforated spring steel strips printed or die-cut with the word "EXIT" at regular intervals, as shown in FIG. 12. As another example, a spring steel strip pre-printed with inches and feet may be applied to any surface in a design studio, such that the strip may be used as a measurement tape against which fabric, paper and the like may be cut.

Figure 13:
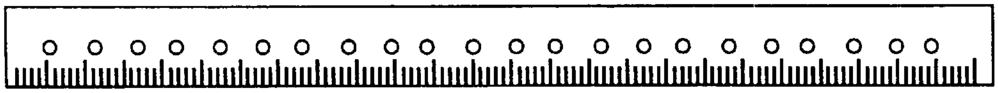
FIG. 13 shows an example of a steel strip for use as a portable straight edge which may be used to draw arcs and circles, in accordance with yet another embodiment of the present invention.

For use in construction or carpentry, the ferromagnetic spring steel strips can function as a long portable straight edge/measuring tape with measurements printed on the strip and the addition of small holes at regular intervals, as shown for example in FIG. 13. In this configuration, the strips may be packaged in a spring loaded version of the container for easy retraction. Standard (non-magnetic, e.g., push-pin) tacks may be used and would pass through the holes to line up the straight edge, pin it up at any necessary length, or to draw perfect curves and circles by tacking one end through the hole for use as a pivot with a pencil drawing an arc through another hole.

In addition, the spring steel strip can be used on a large scale for commercial use to hang billboards and signages for use in, for example, trade shows. Such large signs can have multiple magnets embedded in a back surface thereof and hung on a wall or other surface via spring steel strips adhering to the surface.

A line of products embedded with rare earth magnets, such as hooks, clips, pads of paper, pen-holders and the like, may be used to expand the office capabilities of this apparatus.

In the present invention, the strip of thin ferromagnetic spring steel may be pre-painted in a variety of colors, in a metallic finish, or they can be painted or wallpapered over by the consumer to blend into any environment. The strip can be steel or any other ferromagnetic metal. The metal strips may be packaged along with the above-described dispenser or alone. These strips function like a bulletin board, but require very little space and can be virtually invisible. Furthermore, the items displayed on the strips are held by magnetic force and are consequently not punctured or damaged in at way.

Another benefit to the present invention is that the magnetic tack needs to be handled only to put up the displayed object; the object displayed can be pulled off without handling the tack, which would remain on the spring steel strip because of the magnetic force.

An apparatus for displaying paper, fabric, photographs or the like, in accordance with the present invention, comprises a strip of ferromagnetic spring steel, and a number of small tacks embedded with rare earth magnets or other magnets. The apparatus may also include a tape-like dispenser for storing the strip and the tacks when they are not used.

The strip of spring steel is covered on one face by a strong adhesive. The adhesive side, when the strip has not been used, is covered by a protective layer such as wax paper.

The strip is divided at intervals, which preferably are (but need not be) regular, by respective cuts through the protective paper and adhesive layer, each cut line scoring the spring steel, the cut and score facilitating snapping the spring steel by bending it back and forth at the division line. Alternatively, the user can easily cut the strip to custom lengths by scoring the strip him/herself, using, for example, a razor blade and then snapping the strip. This technique may be used when the existing score lines do not perfectly fulfill the user's need for the specific installation. Also, in an industrial application, it may be desirable that the distributed strip is not pre-scored at all, and the worker scores the strip, at the desired length, at the installation location.

The dispenser may be spring loaded. The container may have one of various shapes, forms and materials. The tacks may have one of various possible different shapes, forms and materials. The spring steel is rolled up inside the dispenser, any length of which can be dispensed and broken at the score line, with the unused portion remaining contained inside the dispenser. The strip of spring steel may spring flat when dispensed. Alternatively, the strip is flattened when applied to a surface. After a desired length of the strip is dispensed and broken at an appropriate score line, the protective paper is removed from it, and the strip is mounted using the adhesive side onto a substantially vertical surface. The mounted strip of spring steel may be used as a bulletin board surface to receive the magnetic tacks.

While embodiments of the present invention have been described in detail above, it should be understood that the invention is not limited to the precise embodiments described. Various changes and modifications thereof could be effected by one skilled in the art without departing from the spirit or scope of the invention recited in the appended claims. Improvements and modifications which become apparent to persons of ordinary skill in the art after reading this disclosure, the drawings and the appended claims are deemed within the spirit and scope of the present invention.

What is claimed is:

1. A strip of ferromagnetic metal for use as a bulletin board for attaching an item along with a magnetic tack on a substantially vertical surface, comprising:

a ferromagnetic layer;

at least one adhesive later attached to one side of the ferromagnetic layer; and a protective later attaced to an outermost one of the at least one adhesive layer, wherein the protective layer is removed before the strip is applied via the at least one adhesive later to the substantially vertical surface, the other side of the ferromagnetic layer is used for attaching the item using the magnetic tack, and the strip is divided at regular intervals by a cut through the protective layer and adhesive layer.

2. The strip of claim 1, wherein the cut scores the ferromagnetic layer to form a division line, and the strip is snapped by bending the strip back and forth at the division line.

3. The strip of claim 1, wherein an unused portion of the strip is stored in a dispenser.

4. The strip of claim 3, wherein the strip is rolled up inside the dispenser.

5. The strip of claim 3, wherein a selected portion of the strip stored in the dispenser is dispensed while another portion of the strip remains contained in the dispenser.

6. The strip of claim 5, wherein the dispensed portion of the strip springs flat when dispensed.

7. The strip of claim 3, wherein the other side of the ferromagnetic layer is preprinted with a predetermined design.

8. An apparatus for attaching an item to be displayed on a substantially vertical surface, comprising:

at least one magnetic tack; and at least one strip comprising ferromagnetic metal, wherein one face of each of the at least one strip is covered by an adhesive for applying the one face to the substantially vertical surface, another face of each of the at least one strip provides a surface for attaching the item using the at least one magnetic tack, and each of the at least one strip is divided at regular intervals by a plurality of score lines, and a selected length of a strip is broken at a selected one of the plurality of score lines.

* * * * *